(12) United States Patent
Christensson et al.

(10) Patent No.: US 8,634,830 B2
(45) Date of Patent: Jan. 21, 2014

(54) METHOD AND ARRANGEMENT IN A TELECOMMUNICATION SYSTEM

(75) Inventors: Anders Christensson, Älvsjö (SE);
Andreas Bergström, Vikingstad (SE);
Paul Schliwa-Bertling, Ljungsbro (SE);
Marten Sundberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 12/965,431

(22) Filed: Dec. 10, 2010

(65) Prior Publication Data

US 2011/0143712 A1 Jun. 16, 2011

Related U.S. Application Data

(60) Provisional application No. 61/285,570, filed on Dec. 11, 2009.

(51) Int. Cl.
*H04W 4/00* (2009.01)

(52) U.S. Cl.
USPC .......... 455/434; 455/418; 455/419; 455/420; 455/422.1

(58) Field of Classification Search
USPC ............... 455/418–420, 422.1, 434
See application file for complete search history.

(56) References Cited

U.S. PATENT DOCUMENTS

| | | | |
|---|---|---|---|
| 2008/0032714 A1* | 2/2008 | Suzuki et al. | 455/458 |
| 2008/0200146 A1* | 8/2008 | Wang et al. | 455/410 |
| 2010/0130204 A1* | 5/2010 | Kanauchi et al. | 455/435.1 |
| 2010/0197294 A1* | 8/2010 | Fox et al. | 455/422.1 |

FOREIGN PATENT DOCUMENTS

| | | |
|---|---|---|
| GB | 2443233 A | 4/2008 |
| WO | 2008/094670 A2 | 8/2008 |

OTHER PUBLICATIONS

3rd Generation Partnership Project. 3GPP TS 22.011, V9.2.0 (Sep. 2009). 3rd Generation Partnership Project; Technical Specification Group Services and System Aspects; Service accessibility (Release 9).

3rd Generation Partnership Project. 3GPP TR 23.898, V2.0.0 (Feb. 2005). 3rd Generation Partnership Project; Technical Specification Group Services and System Aspects; Access Class Barring and Overload Protection; (Release 6).

(Continued)

*Primary Examiner* — Charles Appiah
*Assistant Examiner* — Jaime Holliday
(74) *Attorney, Agent, or Firm* — Coats & Bennett, PLLC

(57) ABSTRACT

Embodiments herein include methods and arrangements for controlling access of mobile devices to a network, such as GSM. The mobile devices belong to an access control class (ACC) and also belong to an additional access control class (EACC) that provides extended access control. The arrangement broadcasts system information to the mobile devices that comprises a first indicator indicating an ACC. The first indicator indicates whether a mobile device is allowed to access or is barred from accessing the network. The system information further comprises a second indicator indicating an EACC. The second indicator indicates whether a mobile device is allowed to access or is limited from accessing the network. Limited access may entail blocking a mobile device from initiating communications with the network, blocking the mobile device from receiving network initiated communications, or both. A mobile device blocked from network initiated communication may not answer a page from the network.

33 Claims, 9 Drawing Sheets

(56) References Cited

OTHER PUBLICATIONS

3rd Generation Partnership Project. 3GPP TS 44.018, V9.2.0 (Sep. 2009). 3rd Generation Partnership Project; Technical Specification Group GSM/EDGE Radio Access Network; Mobile radio interface layer 3 specification; Radio Resource Control (RRC) protocol (Release 9).

* cited by examiner

| 8 | 7 | 6 | 5 | 4 | 3 | 2 | 1 | |
|---|---|---|---|---|---|---|---|---|
| | RACH Control Parameters IEI | | | | | | | octet 1 |
| Max retrans | Tx-integer | | | | | CELL BARR ACCESS | RE | octet 2 |
| AC C15 | AC C14 | AC C13 | AC C12 | AC C11 | AC C10 | AC C09 | AC C08 | octet 3 |
| AC C07 | AC C06 | AC C05 | AC C04 | AC C03 | AC C02 | AC C01 | AC C00 | octet 4 |

Fig. 1

| 8 | 7 | 6 | 5 | 4 | 3 | 2 | 1 | |
|---|---|---|---|---|---|---|---|---|
| | RACH Control Parameters IEI | | | | | | | octet 1 |
| Max retrans | | Tx-integer | | | | CELL BARR ACCESS | RE | octet 2 |
| AC C15 | AC C14 | AC C13 | AC C12 | AC C11 | AC C10 | AC C09 | AC C08 | octet 3 |
| AC C07 | AC C06 | AC C05 | AC C04 | AC C03 | AC C02 | AC C01 | AC C00 | octet 4 |
| EAC C07 | EAC C06 | EAC C05 | EAC C04 | EAC C03 | EAC C02 | EAC C01 | EAC C00 | octet 5 |

Fig. 2

METHOD AND ARRANGEMENT IN A TELECOMMUNICATION SYSTEM

RELATED APPLICATIONS

This application claims priority to U.S. Provisional Application Ser. No. 61/285,570 filed Dec. 11, 2009 and incorporated herein by reference in its entirety.

TECHNICAL FIELD

The present disclosure relates to a method and arrangement in a telecommunication system, and in particular to a method and arrangement for access control.

BACKGROUND

A cellular network with a high penetration of devices, using the network to communicate with servers or other devices, may be overloaded by the devices flooding the signaling interfaces and wasting available system recourses. Many of these devices might not be time critical in the sense that it does not matter if the transfer of data is done directly or waits for a few minutes or even longer.

Mobile devices of different types use the same communication resources in radio access networks and some mobile devices may not be able to access the network due to high traffic created by other mobile devices. Some users of mobile devices are more sensitive to being denied communication, for example users making phone calls, while others, for example machine type communication transferring data, may not be negatively affected if the data transfer is delayed.

In a Global System for Mobile communication (GSM) network, access attempts from non time-critical communication may collide with access attempts for time critical communication. This could lead to overload situations where important traffic, such as voice calls, are lost due to high load on signaling interfaces generated by access attempts made for communication that is not time critical.

The GSM have mechanisms for controlling access, including so called Access Control Classes (ACC). In GSM, each mobile device is assigned an 'Access Control Class' that is coded in the Subscriber Identity Module (SIM) (see 3GPP 44.018 section 10.5.2.29 (RACH control parameters)). The control parameters for the Access Control Classes are broadcasted as a part of system information messages. The parameters specify if a class of mobile devices is allowed to access or barred from accessing the network. A mobile belonging to a barred access class is not allowed to send access bursts to the network, i.e. the mobile is configured so that it may not initiate a call or answer a page, but still may read system information etc. The access classes are randomly assigned ('Access Control Class' 0-9 that is used for public subscriptions).

These classes may be used to limit access during high traffic loads. For example, the operator of the network may block access for 20 percent of the mobile devices by barring two of the ten classes randomly. The network will then create the system information messages wherein the parameters of the two barred access classes are changed and set to indicate barring of these classes. The devices receiving the system information adjusts their access settings accordingly, so that devices belonging to a barred class will not initiate signaling by sending access bursts, and will not answer paging messages from the network.

The system information messages that are broadcasted includes channel information, access information, location information, base station identity etc. In a GSM system the BSS (Base Station Subsystem) broadcasts the system information messages to the mobile devices. The BSS comprises a BSC (Base Station Controller) and a BTS (Base Transceiver Station) and the system information messages are created in the BSC and transferred to the MS (mobile devices) via the BTS, which transmit the system information messages in broadcasts to the mobile devices. Each mobile device receives the system messages and adjusts its settings accordingly.

In Universal Mobile Telecommunication System (UMTS) and Long Term Evolution (LTE) systems, each of the base stations creates the system information messages and transmits the system information messages as broadcast to the devices. Each device adjusts its settings, and subsequently signals in accordance with the settings.

SUMMARY

It is an object to provide an improved method and arrangement to address the problems as outlined above.

It is also an object to provide tools to be able to distinguish between mobile devices needing time critical and non time critical communication and allow time critical communication, but block access attempts for data communication that is not time critical.

These objects and others are obtained by the methods and arrangements as described herein.

Thus, a new access class identifier is created, (denoted 'Extended Access Control Class' in the detailed description). The identifier provides an additional access control class for mobile devices and may be assigned in relation to a subscription service level agreement. Assigning for example mobile devices having time critical communication and mobile devices with less need for real time communication to different access classes provides means for distinguishing between these groups of devices for purposes of access control.

Embodiments herein correspondingly include a method in a mobile device for controlling access of the mobile device to a network. The mobile device is configured to belong to one of a plurality of access control classes, ACC, and is further configured to belong to one of a plurality of extended access control classes, EACC. The method comprises receiving a system information message comprising a first indicator indicating an ACC and a second indicator indicating an EACC; and controlling access to the network based on the received first indicator and/or the received second indicator.

In an embodiment the controlling comprises determining whether the mobile device is allowed access to the network based on the first indicator and when so, determining whether the mobile device is allowed access or limited access to the network based on the second indicator.

In an embodiment the determining comprises determining whether the first indicator indicates an ACC which is the same as the mobile device configured ACC; and when so, determining whether the second indicator indicates an EACC which is the same as the mobile device configured EACC.

In an embodiment, the method further includes, when the second indicator indicates that the mobile device is allowed limited access to the network, configuring the mobile device for limited access.

In an embodiment the configuring comprises blocking mobile initiated communication, and allowing network initiated communication.

In an embodiment the configuring comprises allowing mobile initiated communication and blocking network initiated communication.

In an embodiment the configuring comprises blocking mobile initiated communication and blocking network initiated communication.

After receiving the system information messages, the method preferably includes configuring the mobile device for limited access, when the second indicator indicates that the mobile device is allowed limited access to the network.

Three embodiments of configuring the mobile for limited access are provided. All three types of limited access may be included, or any combination of two of them, enabling an operator of the network to provide different levels of service to different types of devices by sending system information messages indicating which classes of mobile devices are allowed, limited or barred from access.

Embodiments herein also include a mobile device configured to belong to one of a plurality of access control classes, ACC, and being further configured to belong to one of a plurality of extended access control classes, EACC and comprising means for receiving a system information message comprising a first indicator indicating an ACC and a second indicator indicating an EACC. The mobile device comprises means for controlling access to the network based on the received first indicator and/or the received second indicator.

In an embodiment, the means for controlling access to the network further comprises means for determining whether the mobile device is allowed access to the network based on the first indicator and means for determining whether the mobile device is allowed access or limited access to the network based on the second indicator.

In an embodiment the means for controlling access to the network comprises means for limiting access to the network.

In an embodiment the means for limiting access to the network is adapted to block the mobile device from initiating communication, and to allow the mobile device to access the network for communication initiated by the network.

In another embodiment the means for limiting access to the network is adapted to block the mobile device for communication initiated by the network, and to allow the mobile device for initiating communication.

In another embodiment the means for limiting access to the network is adapted to block the mobile device from initiating communication, and to block the mobile device for communication initiated by the network.

An operator may assign different types of mobile devices to different extended access control classes, and use the extended access control classes for extending the access control to provide different levels of service for different types of mobile devices. By assigning mobile devices desiring non-time-critical communication to one of the extended access control classes, time critical communication may be given a higher priority by means of limiting access for the mobile devices belonging to this extended access control class.

This extended control of access is mainly intended for machine type communication, but may for example still be useful for providing additional levels of service for voice and data communication.

In one example embodiment, a normal subscription used for voice/data is given the highest and most prioritized access class meaning that these subscriptions are allowed to access the system at almost all time. Another subscription using e.g. data only to report the status of a meter of some kind is assigned to a class for extended access control that will be given lower priority since it might not be time critical when the report arrives. This would allow the operator to temporarily block access for these subscriptions during high traffic situations and prevent an overload situation.

In another embodiment, some of the 'Extended Access Control Classes' are defined so that the devices associated with them are prohibited from accessing the network to establish a session, but if paged by the network, they are allowed to answer. Having this possibility is beneficial for devices that have some kind of regular self aware reporting period (such as e.g. the above mentioned meter) which could then be blocked at high traffic load situations but from time to time when e.g. a technician will need to contact the device to read the status of a faulty unit before going to fix it or to perform a application SW update, communication could be established.

Furthermore, a method in a network node is provided for controlling access of a mobile device to a network, the mobile device being configured to belong to one of a plurality of access control classes, ACC, and being configured to belong to one of a plurality of extended access control classes, EACC. The method comprises broadcasting a system information message comprising a first indicator indicating an ACC and a second indicator indicating an EACC to the mobile device to be used by the mobile device to control its access to the network.

In an embodiment the method comprises receiving the system information message before broadcasting the system information message.

In another embodiment the method further comprises creating the system information message before broadcasting the system information message.

In an embodiment the method further comprises determining a traffic load, and determining at least the second indicator based on the determined traffic load.

In a further embodiment the method comprises correlating identities for mobile devices determined to be blocked from network initiated communication with addresses of paging messages for such mobile devices.

In an embodiment the method further comprises discarding paging messages for mobile devices determined to be blocked from network initiated communication.

When the access information is broadcasted in the system information messages of the network, the access information is read by the mobile devices. The method enables reducing the number of access attempts in the network by subjecting some of the mobile devices to limited access, so that these devices are barred from sending access bursts.

In a GSM embodiment, the BSC may create the system information message and broadcast the system information via the BTS. For effectuating the method, a node is provided such as an adapted BSC in a GSM network.

An alternative to determining the traffic load, or in addition to determining the traffic load, is to schedule the traffic. Statistical measurements or reports of historical traffic load distribution may be used in order to give mobile devices with non-time critical communication access to the network when low traffic load might be expected or predicted.

An operator may assign mobile devices, for example of different types, to different access classes of the extended access control classes. The operator may then use the method for providing different kinds and/or levels of service to the different classes of mobile devices.

Furthermore an arrangement is provided for controlling access of a mobile device to a network, the mobile device being configured to belong to one of a plurality of access control classes, ACC, and being configured to belong to one of a plurality of extended access control classes, EACC. The arrangement comprises means for broadcasting a system information message comprising a first indicator indicating an ACC and a second indicator indicating an EACC to the mobile device to be used by the mobile device to control its access to the network.

In an embodiment the arrangement further comprises means for receiving the system information message before broadcasting the system information message.

In another embodiment the arrangement further comprises means for creating the system information message before broadcasting the system information message.

In an embodiment the arrangement further comprises means for determining a traffic load, and means for determining at least the second indicator based on the determined traffic load.

In an embodiment the arrangement comprises means for correlating identities for mobile devices determined to be blocked from network initiated communication with addresses of paging messages for such mobile devices.

In an embodiment the arrangement further comprises means for discarding paging messages for mobile devices determined to be blocked from network initiated communication.

An alternative solution for an operator to block access based on traffic type, such as allowing time critical communication and block access for non-time critical communication, and be able to distinguish between different subscriptions, is to e.g. revoke the SIM cards and then replace them with new SIM cards assigned to a subset of the 'Access Control Classes' (say e.g. 0-4). This would make it possible to use the remaining 'Access Control Classes' (in this example 5-9) for the purpose of blocking/allowing access for the associated subscriptions, and assign machine type mobile communication devices that do not need to establish time critical communication to these classes and subjecting them to limited access. This approach is however associated with a considerable administrative burden for the operator. Distributing SIM cards is quite expensive, since they probably have to be sent with secure mail. Many people also have all contacts on the SIM and will need to transfer the contacts to the new SIM card, or a memory of the mobile device when substituting the old SIM with the new SIM.

An advantage achieved by some of the above-disclosed embodiments is to give e.g. an operator of a telecommunication system the opportunity to prioritize time critical communication over communication that is less time critical based on the traffic load in the cell and/or network. If high traffic load is determined, less time critical communication may be postponed until a lower traffic load is determined. A further advantage achieved by some of the above-disclosed embodiments is the opportunity to also avoid access attempts of mobile devices, e.g. if high traffic load is determined.

Other objects, advantages and novel features of the invention will become apparent from the following detailed description of the invention when considered in conjunction with the accompanying drawings and claims.

BRIEF DESCRIPTION OF THE DRAWINGS

For a better understanding, reference is made to the following drawings and preferred embodiments of the invention.

FIG. 1 shows a RACH Control Parameters information element,

FIG. 2 shows a RACH Control Parameters information element, expanded with one octet of 'Extended Access Control Class'.

DETAILED DESCRIPTION

Figure 4:
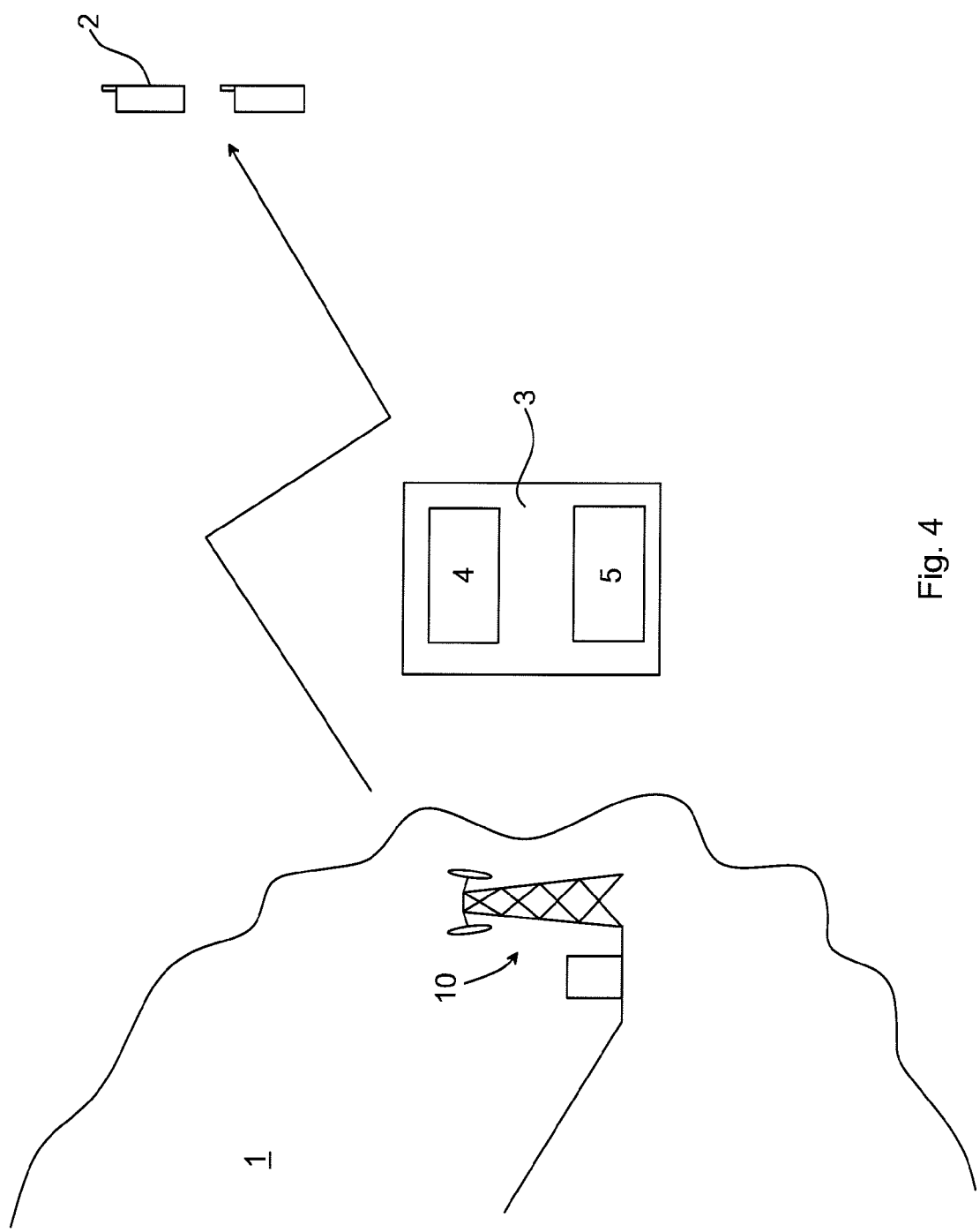
FIG. 4 shows an embodiment of a radio access network.
Figure 5A:
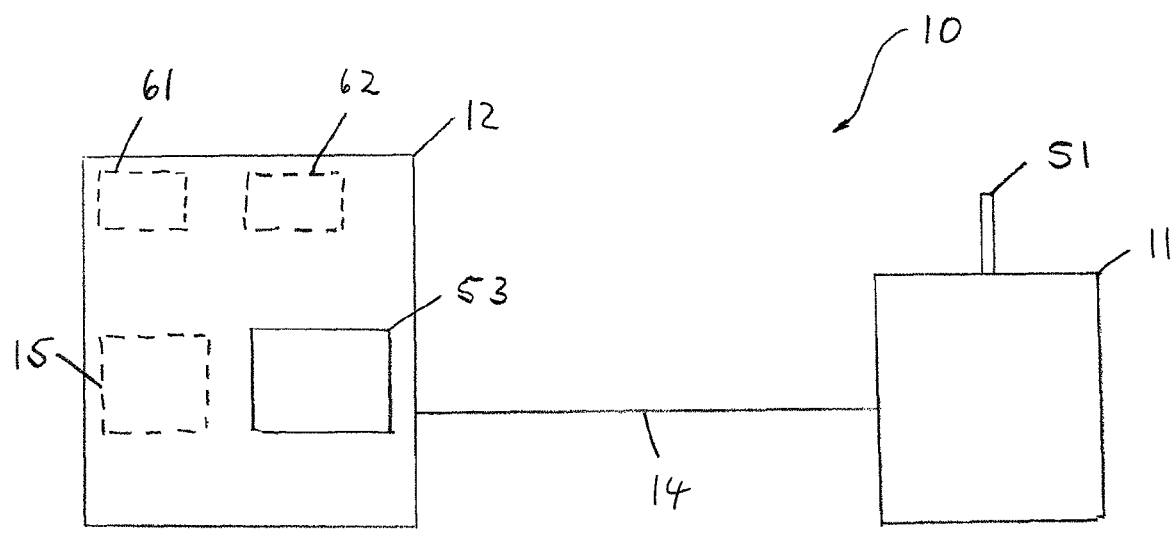
FIGS. 5a-b shows two embodiments of access control arrangements.

FIG. 4 illustrates a radio access network 1 including an arrangement or node 10 for providing access to mobile devices 2 to the network 1. The access arrangement 10 is provided to broadcast messages 3 to mobile devices 2, and provide communication between the mobile devices 2 and the network 1. FIG. 4 illustrates a broadcast from the access arrangement 10 to mobile devices 2, which broadcast comprises a system information message 3 including access information, especially access class information 4, 5 for mobile devices belonging to an access class 4 (e.g. ACC) and an additional access class 5 (e.g. EACC). The access information 4 indicates whether mobile devices belonging to the access control class (ACC) are allowed to access or are barred from accessing the network. The additional access information indicates whether mobile devices belonging to the extended access control class (EACC) are allowed to access or are limited from accessing the network. Examples of embodiments of arrangements are described in FIGS. 5a and 5b. FIG. 5a illustrates an arrangement comprising a base station controller and a base station in GSM, while FIG. 5b illustrates an arrangement comprising a single node, e.g. a base station in LTE.

FIG. 5a illustrates by way of example the access arrangement 10 in the form of a GSM Base Station Subsystem (BSS) including a Base Station Controller (BSC) 12 operatively connected by a cable 14 to a base station (Base Transceiver Station BTS) 11. In a WCDMA system the arrangement would comprise a Radio Network Controller (RNC) and a Node B arranged in the same manner as in FIG. 5a.

In the following, a GSM BSS is described more in detail. The BSC comprises the control means (not illustrated) for the BSS and the BTS comprises transmitter and receiver (not illustrated) for the air interface to the mobile devices. Normally one BSC controls several BTS, but for reasons of clarity only one BTS is illustrated. The BSC further comprises creating means 53 for creating system information messages comprising a first indicator indicating an ACC and a second indicator indicating an EACC. During operation, the BSC creates system information messages comprising the first and the second indicator. These system information messages are transferred to the BTS, e.g. via a cable 14 or by wireless communication. The BTS 11 comprises broadcasting means 51 for broadcasting the system information messages comprising the first and the second indicator to mobile devices 2. The BSC of FIG. 5a may also comprise third determining means 15 for determining a traffic load i.e. traffic load information of the cell and/or network. The BSC may comprise first determining means 61 for determining at least the first indicator and/or second determining means 62 for determining at least the second indicator based on the traffic load determined by the third determining means. Thus, the BSC 12 is suitably configured to use traffic load data, e.g. as determined by the third determining means 15, for determining which access control classes and extended access control classes should be subjected to limited or totally barred communication, and create the system information message accordingly.

Figure 5B:
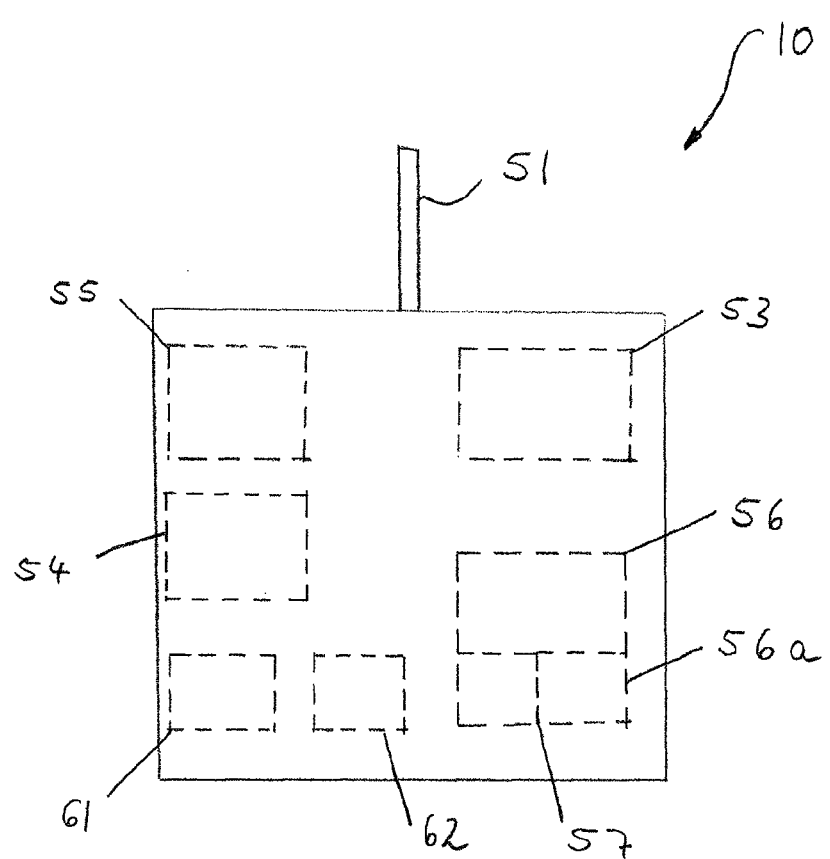

FIG. 5b illustrates another embodiment of the access arrangement 10, such as a base station in LTE (eNodeB), wherein a base station 52 comprises broadcasting means for broadcasting 51, such as an antenna or an antenna port, as well as it may comprise creating means 53 for creating system information messages. Note that the base station 52 may alternatively to the creating means 53 comprise receiving means 54 configured to receive system information messages from another network node e.g. MME, RNC, eNodeB, BSC. The receiving means 54 may be an antenna port, a transceiver or a receiver.

Continuing the description of FIG. 5b, the base station 52 may also comprise third determining means 55 for determining a traffic load, such as a central processer unit (CPU) or a processing circuitry or a processor.

Similar to the arrangement of FIG. 5a, the arrangement 10 e.g. the base station 52, may create or receive system information messages including first indicators indicating allowed or blocked access to the network for the different access classes (ACC) and second indicators indicating allowed or limited access to the network for the additional access classes (EACC). Some or all of these indicators may be based on the determined traffic load. FIG. 5b also illustrates handling means 56 for handling messages that are integrated into the base station 52, but may alternatively be communicatively connected to the base station 52. The handling means 56 may comprise correlating means 56a for making a correlation between a mobile device(s) subjected to limited or barred access, as indicated in the system information messages created by the creating means 53, and addresses derived from messages arriving from the network 1 destined to mobile devices 2. These correlations may be used by the handling means 56 for handling the messages, for example for saving them. The handling means 56 for handling messages may include discarding means 57 configured to discard messages destined for mobile devices that are barred from network initiated communication, and are not allowed to answer a paging for receiving a message.

Note, the above-mentioned creating means 53, the first determining means 61, the second determining means 62 and the third determining means (15, 55), the handling means 56, the correlating means 56a and the discarding means 57 may be each a separate physical part or an integrated part of circuitry in the arrangement, i.e. the node covered by the node claims. Also, the above-mentioned creating means 53, the third determining means 55, the handling means 56, the correlating means 56a and the discarding means 57 may have distributed functionality within one or several physical entities. As an example, the CPU may comprise one or several of the above-mentioned means (53, 55, 56, 56a, 57); (53, 15, 56, 56a, 57).

When the traffic load is determined in any of the embodiments, such as those illustrated in FIGS. 5a and 5b, the control signal channels, communication channels or internal processing may be used as a measure on the traffic load. The BSC of FIG. 5a may determine the traffic loads based on its internal processing, or usage of control signal channels or communication channels of each BTS. Similarly, in FIG. 5b, the base station (such as an eNodeB) may determine the traffic load on its control or communication channels, or its own internal processing. Traffic load information may also be determined through the communication with other nodes of the network or the core network, or traffic load levels may also be received from other nodes of the network or the core network. The traffic load is suitable determined in real time, but it may be provided from historical data, for example subjected to statistical calculations. Scheduling of traffic to different days, or time of day, may also be used for avoiding congestion due to traffic load. Scheduling may be used as an alternative or in addition to determining traffic load.

Figure 7:
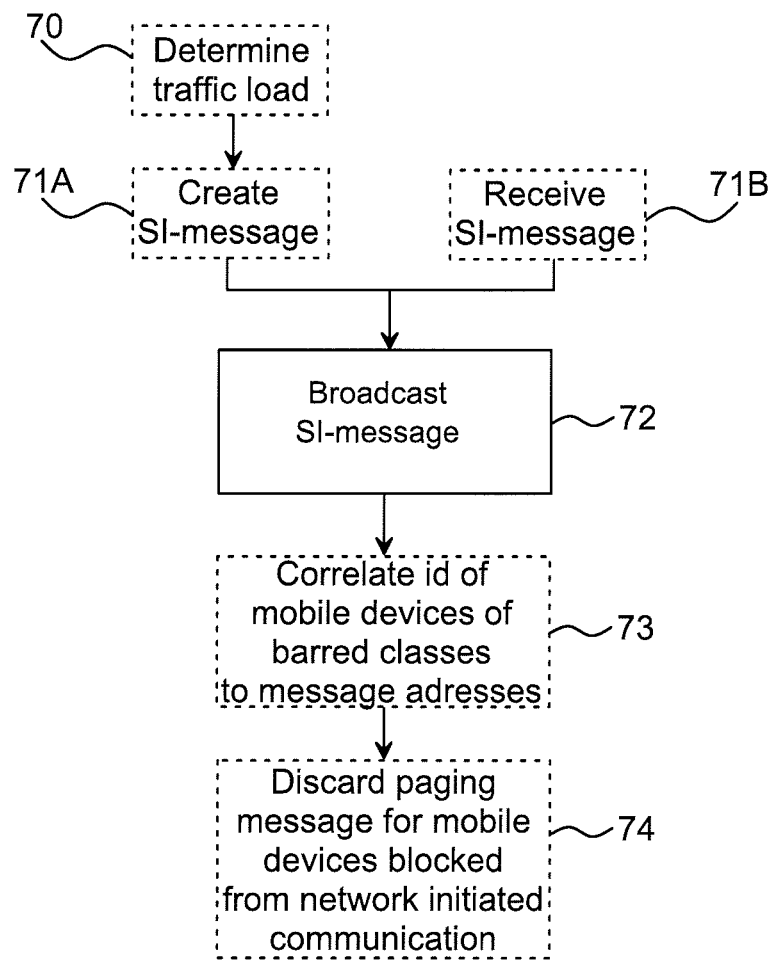
FIG. 7 shows is a flow chart exemplifying the method for providing access as may be effectuated by the arrangement of FIG. 5a, FIG. 8 is a flow chart exemplifying the method for providing access as may be effectuated by the arrangement of FIG. 5b.

FIG. 7 is a flow chart exemplifying the method for providing access as may be effectuated by the arrangement of FIG. 5a.

Figure 8:
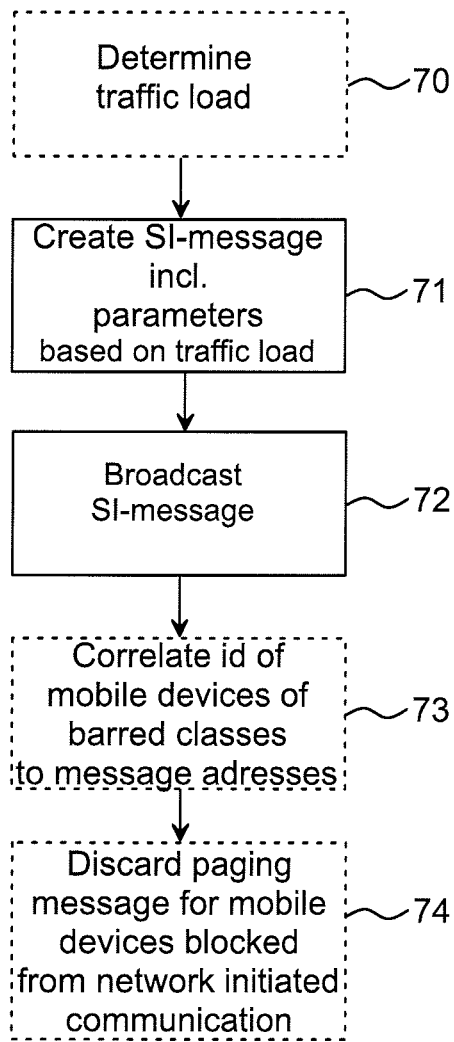

FIG. 8 is a flow chart exemplifying the method for providing access as may be effectuated by the arrangement of FIG. 5b.

In FIG. 7, the arrangement 10 of FIG. 5a, broadcasts the system information message (step 72). This system information message includes parameters for controlling access of mobile devices belonging to an "Access Control Class", and also the additional parameters for extended control of access of mobile devices also belonging to an "Extended Access Control Class". This access control method may also include additional steps indicated by dashed contour. FIG. 7 illustrates a method for controlling access by means of a base station (BTS) which starts with the step of receiving 71B the system information message, after which follows the subsequent step 72 of broadcasting the system information message. A BTS receives the system information message from the base station controller (BSC) of the base station subsystem.

FIG. 7 also illustrate steps carried out in a BSS as a whole, i.e. steps carried out in the BSC as well as steps carried out by the BTS. The method performed by the BSS comprises the step of broadcasting 72 the system information message. It may also include additional steps indicated by dashed contours. In GSM the system information messages are created by the BSC of the BSS, and it is suitable to create the system information messages according to embodiments herein in the BSS. Thus, prior to the step of broadcasting the system information message, the method includes the step of creating 71A the system information message. The creating step 71A may include considering the traffic load of the cell or network, and the method is exemplified as including the step of determining 70 the traffic load before creating 71A the system information message. With a high traffic load, more access classes of the extended access control classes (EACC) are suitably subjected to limited access, i.e. the parameters indicating the access information is set in accordance with the traffic load. This makes it possible to provide access to time critical communication, by limiting access attempts from mobile devices employing non time critical communication, without negatively affecting them since these communications are only delayed.

The method may also include some steps for handling messages. It may be unnecessary to page mobile devices that are not allowed to answer paging messages. For this purpose, it is suitable to identify incoming messages for mobile devices that are not allowed to receive the messages. The method therefore includes the step of correlating 73 paging messages to mobile devices that are blocked from network initiated communication. When such paging messages are identified the method is suitably adapted to perform the step of discarding 74 the paging messages.

The network may suitably be adapted to include an indication of the EACC to which the mobile device belongs, especially for mobile devices belonging to an EACC that does not allow network initiated communication when barred, when paging the mobile devices. The network node (BSC), through which the paging message is sent, may then receive the EACC from the paging message and check (step 73) if this EACC is barred. The node is suitably adapted to discard (step 74) such paging messages when network initiated communication is not allowed.

Alternatively, another node of the network, preferably a node such as MSC (Mobile Switching Center) or SGSN (Serving GPRS Support Node) in GSM, may make the correlation (of step 73) and discard the messages (step 74).

FIG. 8 illustrates the access control method performed by the base station of FIG. 5b. The method includes the step of creating 71 the system information message and the step of broadcasting 72 the system information message. It is suitable to also use traffic load for creating the system information message and indicate the access settings on the basis of the traffic load. The method therefore suitably includes determining (step 70) the traffic load before creating 71 the system information message. In addition, or alternatively, the traffic may be scheduled.

Subsequently, the method suitable includes the step of correlating 73 the identity of blocked mobile devices with paging message addresses, and also preferably includes the step of discarding 74 such paging messages, when these have identified (in step 73). Similar to the adaptations of the network discussed regarding FIG. 7, the network may include an indication of to which additional access control class the mobile device belong when sending a paging message through the node of FIG. 8, so that a correlation (step 73) between paging messages and mobile devices barred from network initiated communication may be made, followed by discarding (step 74) the paging message.

Figure 9:
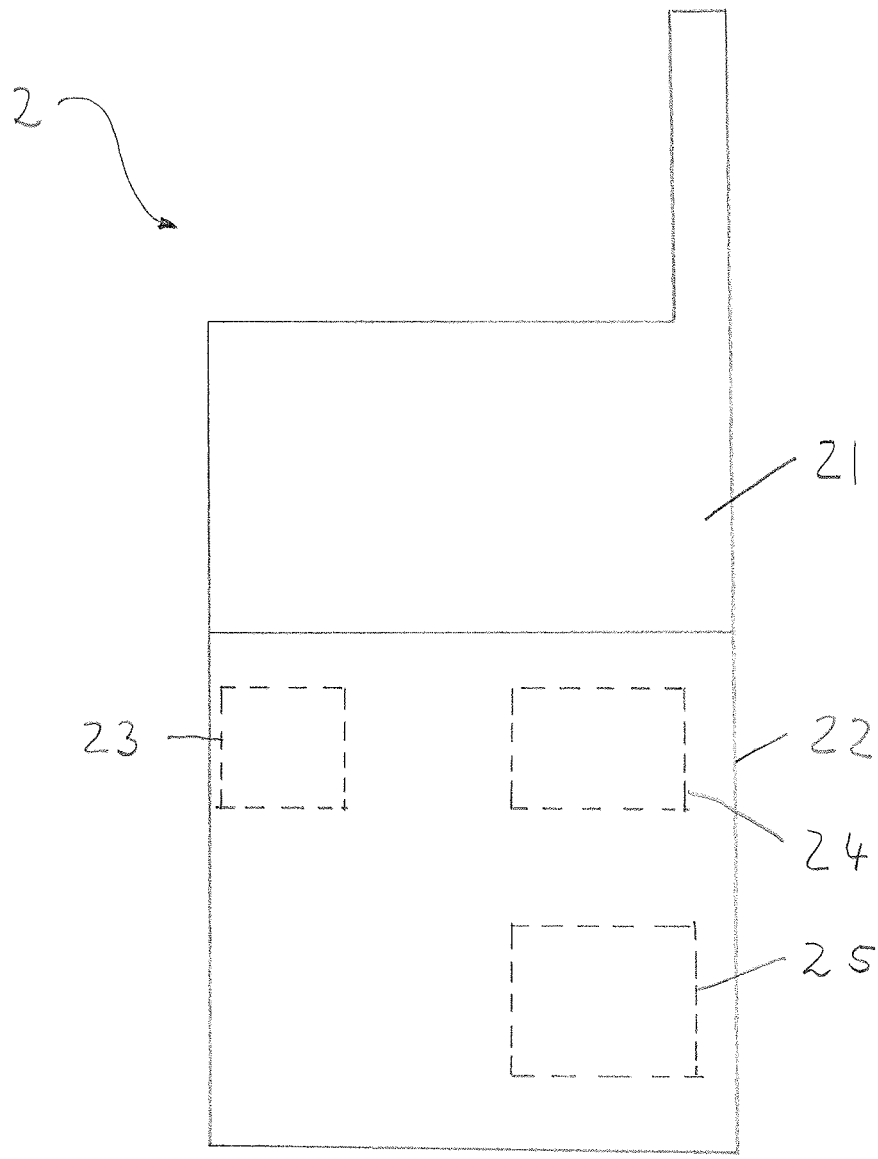
FIG. 9 illustrates an embodiment of a mobile device.

FIG. 9 illustrates a mobile device 2, such as a mobile phone, a parking meter, a fire detector, an earth quake warner, an electricity meter, a vending machine or any other machine having radio communication means. The mobile device 2 is configured to belong to one of a plurality of access control classes, ACC, and is further configured to belong to one of a plurality of extended access control classes, EACC. The mobile device 2 comprises receiving means 21 means 21 adapted to or configured for receiving a system information message comprising a first indicator indicating an ACC and a second indicator indicating an EACC. The mobile device 2 also comprises controlling means 22 adapted to or configured for controlling access to the network based on the received first indicator and/or the received second indicator. The controlling means 22 may also be used to configure the mobile device 2 to communicate in accordance with access information received in the system information messages.

The above-mentioned receiving means 21 may be a transceiver or a receiver or a receiver circuitry, and the above-mentioned controlling means 22 may be a central processing unit, a processing circuitry or a part of a receiver circuitry.

According to one embodiment, the controlling means 22 mentioned above in relation to FIG. 9 may further comprise first determining means 23 for determining whether the mobile device 2 is allowed access to the network 1 based on the first indicator. Furthermore, the controlling means 22 may comprise second determining means 24 for determining whether the mobile device 2 is allowed access or limited access to the network 1 based on the second indicator. Note that the controlling means 22 and the first and the second determining means 23, 24 may be separate or integrated parts of a CPU of the mobile device 2 or a processor circuitry of the mobile device 2, i.e. that they may have separate functionality within the same physical entity or in different physical entities.

According to an example of an embodiment the controlling means 22 may comprise limiting means 25 for limiting access to the network. The limiting means 25 may be adapted to or configured for blocking the mobile device 2 from initiating communication, and to allow the mobile device 2 to access the network 1 for communication initiated by the network 1, e.g. for answering paging messages.

Alternatively to the above-mentioned, the limiting means 25 may be adapted to block the mobile device 2 for communication initiated by the network 1 and to allow the mobile device 2 for initiating communication.

According to yet another alternative, the limiting means 25 may be adapted to block the mobile device 2 from initiating communication, and to block the mobile device 2 for communication initiated by the network 1 e.g. receiving paging messages.

Figure 6:
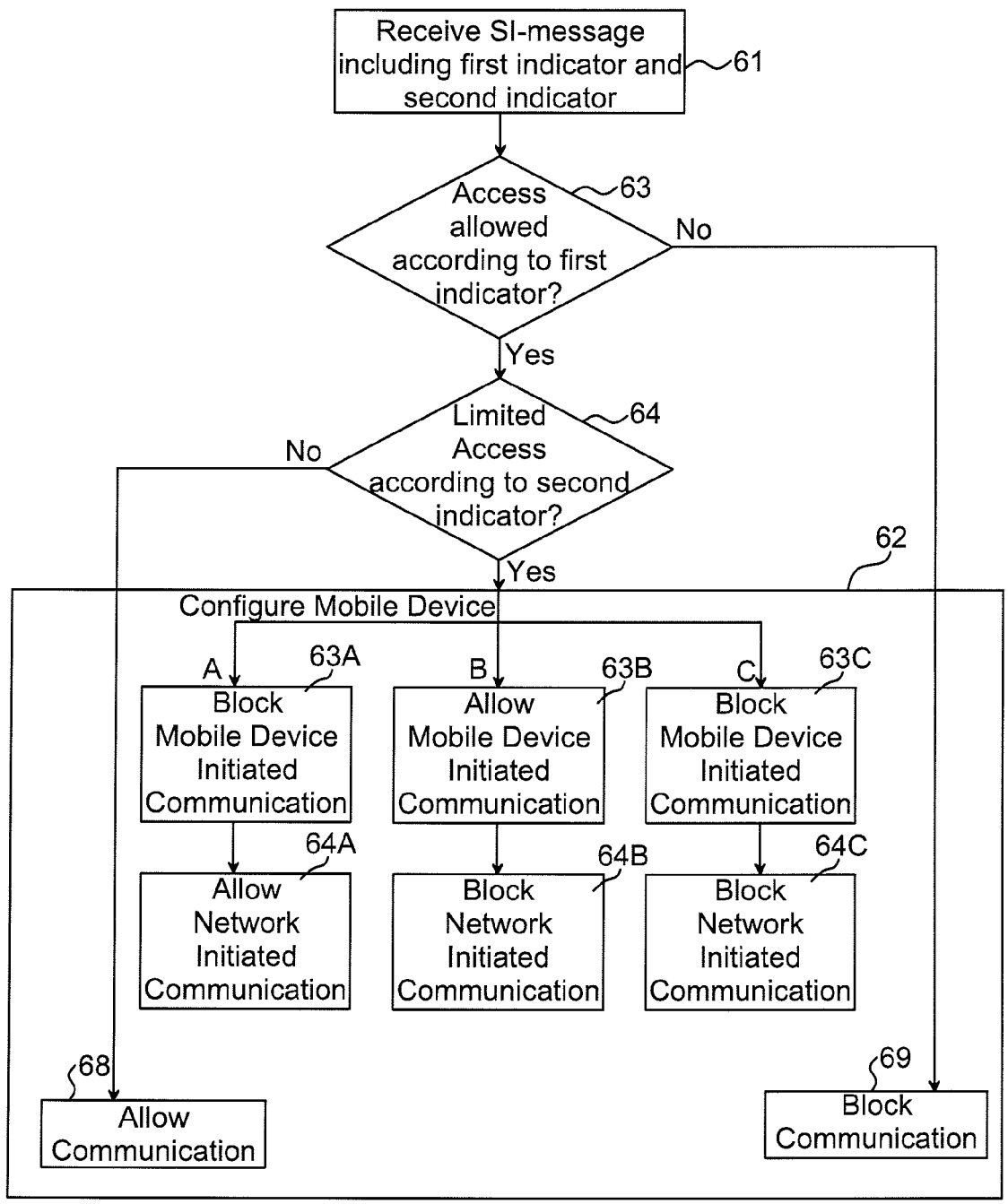
FIG. 6 illustrates the method for controlling access performed in the mobile device of FIG. 9.

FIG. 6 illustrates the method for controlling access employed in the mobile device. The method comprises the step of receiving 61, in the mobile device 2, system information messages, which include the access information for the access classes and the additional access classes, e.g. extended access control class parameters and access control class parameters.

The step of receiving 61 is followed by a step of configuring 62 the mobile device to communicate in accordance with the access rules. Thus the communicating means 21 of the mobile device will communicate accordingly. FIG. 6 illustrates three different examples A, B and C for configuring the mobile device. The operator may provide services for all three types of mobile devices, and the different type of access control A, B, C may also be effectuated in different situations, such as different amounts of traffic.

Thus, the configuring step 62 includes, for a mobile device with access control type A, the steps of blocking 63A the mobile device from initiating communication and allowing 64A network initiated communication, i.e. the mobile device is allowed to answer paging from the network Access control type B includes the steps of allowing 63B mobile initiated communication, and the step of blocking network initiated communication for mobile devices of type B.

The configuring step 62 for access control type C includes blocking 63C the mobile device from initiating communication and also blocking 64C network initiated communication.

The configuration of a mobile device for belonging to an additional access control class preferably includes defining the limited access. A mobile device may suitable be pre-configured for each of the classes, type A, B and C. The mobile device may be assigned to the additional access class when a subscription is created. An indication will then suitably be made in the network, such as in a home location register, and, for example, on a SIM card of the mobile device, or programmed into the device.

FIG. 6 also illustrates how the access classes ACC are used to control access of the mobile device. The method includes determining 63 if the access class to which the mobile device belong is allowed to access the network. If access is not allowed the method includes the step of blocking 69 communication. If the mobile device is allowed to access the network in accordance with the first indicator of the access control class, the method proceeds with determining 64 if the mobile device is subjected to limited access based on the second indicator indicating an extended access control class. If the mobile device is not subjected to limited access, the method continues with allowing communication 68.

Mobile devices that do not belong to any additional control class, EACC, preferably determine (63) if access is allowed according to the first indicator. If access is allowed (in step 63), such mobile devices proceed to the step of allowing communication 68. If access is not allowed, such mobile devices proceed to the step of blocking 69 communication.

An example of how an operator may chose to configure the network is illustrated in table 1:

TABLE 1

Example of Extended Access Control Classes

| Extended Access Control Class | Device Initiated | NW initiated (paging) |
|---|---|---|
| 0 | Barred at 80% | Barred at 80% |
| 1 | Barred at 90% | Barred at 90% |
| 2 | Barred at 80% | Not barred |
| 3 | Barred at 90% | Not barred |
| 4 | Not barred | Barred at 80% |
| 5 | Not barred | Barred at 90% |
| 6 | ... | ... |
| 7 | ... | ... |

A device initiated communication means that the device on its own tries to initiate a connection to send or receive a message. A network initiated communication means that the network side will start the communication by paging the device to be able to send or receive a message to the device.

Here the operator has chosen to define that e.g. Extended Access Control Class 2 (see example in Table 1) will be barred from device initiated communication at 80% load in the system but if this device is paged by the network it is always allowed to answer. If the device however belongs to Extended Access Control Class 4, the device may access the network at all time but is not allowed to answer a page when this access class is subjected to limited access. This could be useful if the normal communication path for this device is for the network to ask for data which is not critical if the report arrives late or not but the device may always initiate communication if an unexpected event occurs that immediately needs to be reported.

In order for this new procedure to work, the network needs to be able to repeatedly broadcast information in the network/cell of which 'Extended Access Control Classes' that at any given time are allowed to access the network and which 'Extended Access Control Classes' are subjected to limited access. For the already existing access control classes of GSM; the 'Access Control Classes', this is done by indication in the RACH Control Parameters' as defined in Section 10.5.2.29 of 3GPP TS 44.018. This RACH Control Parameters' information element are then broadcasted in the SYSTEM INFORMATION TYPE 1, 2, 2bis, 3, and 4 messages, and looks as it is defined in this standard, as in FIG. 1, having the parameter elements for the access classes arranged in octets 3 and 4.

The bits indicated by 'AC Cxx' in FIG. 1 are here used to control which 'Access Control Classes' that are allowed access to the network at any given time as described as in Table 2 below:

TABLE 2

RACH Control Parameters information element
(cut-out of Table 10.5.2.29.1 in 3GPP TS 44.018)

AC CN, Access Control Class N (octet 3(except bit 3) and octet 4)
For a mobile station with AC C = N access is not barred if the AC CN bit is coded with a "0"; N = 0, 1, . . . 9, 11, . . . , 15.

Now, in order to introduce the proposed idea of introducing 'Extended Access Control Classes', this may be achieved in a number of different ways as, in the examples listed in the following sub-sections. Please not that the coding used in these sections although feasible, shall be seen merely as examples. There may be other possibilities in how the exact coding may be done.

EXAMPLE 1

Expansion of the Existing RACH Control Parameters' Information Element

The RACH Control Parameters are expanded as per FIG. 2, for an exemplified case of eight new 'Extended Access Control Classes': EACC C00-007 in octet 5.

FIG. 1 shows the RACH Control Parameters information element, expanded with one octet of 'Extended Access Control Class' bits denoted 'EAC Cxx'. The corresponding description to be inserted into Table 10.5.2.29.1 in 3GPP TS 44.018 are indicated below in Table 3 below:

TABLE 3

RACH Control Parameters information element
(cut-out of Table 10.5.2.29.1 in 3GPP TS 44.018)

EAC CN, Extended Access Control Class N (octet 5)
For a mobile station with EAC C = N access is not barred if the EAC CN bit is coded with a "0"; N = 0, 1, . . . 7.

The above example with eight 'Extended Access Control Classes' could alternatively be expanded to e.g. sixteen such 'Extended Access Control Classes' by adding yet another octet to the RACH Control Parameters' information element.

The drawback with this approach is that this solution will not be backwards compatible, since a prior art mobile device of the 3GPP TS 44.018 (below called legacy MS) will not know how to interpret the extra 'EAC Cxx' bits which may disturb the decoding of subsequent data in the SYSTEM INFORMATION TYPE 1, 2, 2bis, 3, and 4 messages.

EXAMPLE 2

Creating a New 'Extended RACH Control Parameters' Information Element

Figure 3:
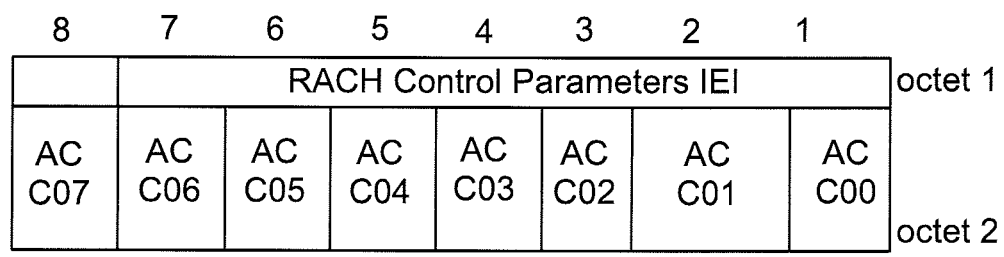
FIG. 3 shows an extended RACH Extended Control Parameters' information element.

In order to ensure backwards compatibility then, rather than expanding the existing RACH Control Parameters information element of 3GPP TS 44,018 as described above, instead introduce a new 'Extended RACH Control Parameters' information element that also will be sent in the SYSTEM INFORMATION TYPE 1, 2, 2bis, 3, and 4 messages. This need not contain any other information than the new 'EAC Cxx' bits such as e.g. the Tx-integer, CELL BARR ACCESS etc. since these are already included in the (mandatory) RACH Control Parameters' information element. The new information element may thus be as depicted in FIG. 3. FIG. 3 shows the 'Extended RACH Control Parameters' information element, containing only the 'RACH Extended Control Parameters IEI' and the 'Extended Access Control Class' bits denoted 'EAC Cxx'.

In e.g. the SYSTEM INFORMATION TYPE 1 message, the new 'Extended RACH Control Parameters' may be added as an optional information element as shown in Table 4 below, where the additions appear in the last row:

TABLE 4

SYSTEM INFORMATION TYPE 2 message content
(cut-out from Table 9.1.32.1 in 3GPP TS 44.018) with the optional
'Extended RACH Control Parameters' added in the last row.

| IEI | Information element | Type/Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | ½ |
| | Skip Indicator | Skip Indicator 10.3.1 | M | V | ½ |
| | System Information Type 2 Message Type | Message Type 10.4 | M | V | 1 |
| | BCCH Frequency List | Neighbour Cell Description 10.5.2.22 | M | V | 16 |
| | NCC Permitted | NCC permitted 10.5.2.27 | M | V | 1 |
| | RACH Control Parameter | RACH Control Parameters 10.5.2.29 | M | V | 3 |
| XX | Extended RACH Control Parameter | RACH Control Parameters 10.5.2.29 | O | TV | 2 |

Since any legacy MS will not be able to recognize the IEI=XX for the 'Extended RACH Control Parameters' information element, a legacy MS will then according to the already defined procedures in 3GPP TS 44.018 ignore this information element. Hence, the solution is backwards compatible. The L2 Pseudo Length of this message will thus be 24 octets rather than the 22 octets as it is in 3GPP TS 44.018 today.

Again, the above solution could alternatively be expanded to more than eight 'Extended Access Control Classes, by adding more octets to the 'Extended RACH Extended Control Parameters' information element in FIG. 3 and changing the Length and L2 Pseudo Length in Table 4 above accordingly.

This method could be used for the SYSTEM INFORMATION TYPE 1, 2, 2bis, 3, and 4 messages.

EXAMPLE 3

Adding 'Extended Access Control Class' Information to the Rest Octets

An alternative approach to the solutions described in example 1 and example 2 above, would be to rather add the 'Extended Access Control Class" information to the rest octets of the respective systems information messages, instead of creating a new information element. As an example, for SYSTEM INFORMATION Type 1 this may be achieved by modifying the SI 1 Rest Octets as described in 10.5.2.32 of 3GPP TS 44.018 as indicated below:

SI 1 Rest octets expanded with 'Extended Access
Control Class' bits for the example of eight such classes.

<SI1 Rest Octets> ::=
  {L |H <NCH Position : bit (5)> }
  < Band indicator >
  { null | L     -- Receiver compatible with earlier release SI 1 Rest octets expanded with 'Extended Access
Control Class' bits for the example of eight such classes.

| H     - Additions in Rel-10
  { 0 | 1 <Extended Access Control Class : bit (8)> }
  }
  <spare padding> ;
< Band indicator > ::=
  < BAND_INDICATOR : bit == L >     -- ARFCN
  indicates 1800 band
  | < BAND_INDICATOR : bit == H > ;   -- ARFCN indicates
  1900 band The corresponding description to be inserted into Table 10.5.2.32.1a in 3GPP TS 44.018 would then be as per Table 5 below:

TABLE 5

SI 1 Rest Octets information elements details to be added for the
'Extended Access Control Class' in Table 10.5.2.32.1a in 3GPP TS
44.018

Extended Access Control Class (8 bit field)
If preset, this field indicated that for a mobile station with Extended Access Control Class = N, access is not barred if the bit is coded with a "0", where N indicates the bit position in the bitmap; N = 0, 1, . . . 7. If this field is not present, then access is not barred for any Extended Access Control Class.

Any legacy MS (of 3GPP TS 44.018) will just see this added information as spare padding. Hence, the solution is backwards compatible. Also, the Length and L2 Pseudo Length in of the SYSTEM INFORMATION TYPE 1 message (in Table 9.1.31.1) is updated accordingly.

This method could be used for the 3GPP TS 44.018 SYSTEM INFORMATION TYPE 1, 2bis, 3, and 4 messages, however not for SYSTEM INFORMATION TYPE 2 since that contains no Rest Octets.

Embodiments described above include methods and arrangements for controlling access of a mobile device to a network, such as GSM. The mobile devices belong to an access control class (ACC) and for providing extended access control they also belong to an additional access control class (EACC). The arrangement broadcasts system information to the mobile devices, which system information indicates whether mobile device, which belong to an access control class (ACC), is allowed to access or are barred from accessing the network, and the system information further indicates whether the mobile device, which also belong to an extended access control class (EACC), is allowed to access or are limited from accessing the network. Different ways for limiting access is provided. An example is to block the mobile device from initiating communication, and allow the mobile device for communication initiated by the network. Another example is to block the mobile device from communication initiated from the network, and allow the mobile for initiating communication. A further example is to block the mobile device from initiating communication, as well as for communication initiated by the network. A mobile device blocked from network initiated communication is not allowed to answer a paging from the network.

The present invention may, of course, be carried out in other ways than those specifically set forth herein without departing from essential characteristics of the invention. As one example, many of the above embodiments were described with reference to a GSM network, but the present invention may equally apply to other 3GPP Radio Access Technologies, like UMTS or LTE. in this regard, the present embodiments are to be considered in all respects as illustrative and not restrictive, and all changes coming within the meaning and equivalency range of the appended claims are intended to be embraced therein.

What is claimed is:

1. A method in a mobile device for controlling access of the mobile device to a network, the mobile device being configured to belong to one of a plurality of access control classes (ACC) and to belong to one of a plurality of extended access control classes (EACC), the method comprising:
   receiving a system information message comprising a first indicator indicating an ACC among said plurality of ACCs and a second indicator indicating an EACC among said plurality of EACCs, wherein said ACCs and said EACCs are different types of classes for controlling access to the network; and
   controlling access to the network based on at least one of the received first indicator and the received second indicator.

2. The method according to claim 1, wherein said controlling comprises:
   determining whether or not the mobile device is allowed access to the network based on the first indicator; and
   if the mobile device is allowed access, determining whether the mobile device is allowed access or limited access to the network based on the second indicator.

3. The method according to claim 2, wherein said determining comprises:
   determining whether the first indicator indicates an ACC which is the same as the mobile device configured ACC; and
   if so, determining whether the second indicator indicates an EACC which is the same as the mobile device configured EACC.

4. The method according to claim 1, further comprising configuring the mobile device for limited access responsive to receiving a system information message that comprises a second indicator indicating that the mobile device is allowed limited access to the network.

5. The method according to claim 4, wherein said configuring comprises blocking mobile initiated communication, and allowing network initiated communication.

6. The method according to claim 4, wherein said configuring comprises allowing mobile initiated communication and blocking network initiated communication.

7. The method according to claim 4, wherein said configuring comprises blocking mobile initiated communication and blocking network initiated communication.

8. The method according to claim 1, wherein the second indicator is set in response to a subscription service level associated with the mobile device.

9. A mobile device configured to belong to one of a plurality of access control classes (ACC) and to belong to one of a plurality of extended access control classes (EACC), and the mobile device comprising:
   a receiving circuit for receiving a system information message comprising a first indicator indicating an ACC among said plurality of ACCs and a second indicator indicating an EACC among said plurality of EACCs, wherein said ACCs and said EACCs are different types of classes for controlling access to the network; and
   a controlling circuit for controlling access to the network based on the received first indicator, the received second indicator, or both.

10. The mobile device of claim 9, wherein the controlling circuit further comprises:
    a first determining circuit for determining whether the mobile device is allowed access to the network based on the first indicator; and
    a second determining circuit for determining whether the mobile device is allowed access or limited access to the network based on the second indicator.

11. The mobile device according to claim 9, wherein the controlling circuit comprises a limiting circuit for limiting access to the network.

12. The mobile device according to claim 11, wherein the limiting circuit is configured to block the mobile device from initiating communication, and to allow the mobile device to access the network for communication initiated by the network.

13. The mobile device of claim 11, wherein the limiting circuit is configured to block the mobile device for communication initiated by the network, and to allow the mobile device for initiating communication.

14. The mobile device of claim 11, wherein the limiting circuit is adapted to block the mobile device from initiating communication, and to block the mobile device for communication initiated by the network.

15. The mobile device according to claim 9, wherein the receiving circuit comprises a transceiver, a receiver, or a receiver circuitry.

16. The mobile device according to claim 9, wherein the controlling circuit comprises a central processing unit, a processing circuitry, or a part of a receiver circuitry.

17. The mobile device according to claim 9, wherein the second indicator is set in response to a subscription service level associated with the mobile device.

18. A method in an arrangement for controlling access of a mobile device to a network, the mobile device configured to belong to one of a plurality of access control classes (ACC) and to belong to one of a plurality of extended access control classes (EACC), wherein the method comprises broadcasting to the mobile device a system information message comprising a first indicator indicating an ACC among said plurality of ACCs and a second indicator indicating an EACC among said plurality of EACCs that control the mobile device's access to the network, wherein said ACCs and said EACCs are different types of classes for controlling access to the network.

19. The method according to claim 18, wherein the method further comprises receiving the system information message before broadcasting the system information message.

20. The method according to claim 18, wherein the method further comprises creating the system information message before broadcasting the system information message.

21. The method according to claim 18, wherein the method further comprises:
    determining a traffic load;
    determining at least the second indicator based on the determined traffic load.

22. The method according to claim 21, wherein the method further comprises correlating identities for mobile devices determined to be blocked from network initiated communication with addresses of paging messages for such mobile devices.

23. The method according to claim 22, wherein the method further comprises discarding paging messages for mobile devices determined to be blocked from network initiated communication.

24. The method according to claim 18, wherein the second indicator is set in response to a subscription service level associated with the mobile device.

25. An arrangement for controlling access of a mobile device to a network, the mobile device configured to belong to one of a plurality of access control classes (ACC) and to belong to one of a plurality of extended access control classes (EACC), wherein the arrangement comprises a broadcasting circuit for broadcasting to the mobile device a system information message comprising a first indicator indicating an ACC among said plurality of ACCs and a second indicator indicating an EACC among said plurality of EACCs that control the mobile device's access to the network, wherein said ACCs and said EACCs are different types of classes for controlling access to the network.

26. The arrangement according to claim 25, wherein the arrangement further comprises a receiving circuit for receiving the system information message before broadcasting the system information message.

27. The arrangement according to claim 25, wherein the arrangement further comprises a creating circuit for creating the system information message before broadcasting the system information message.

28. The arrangement according to claim 25, wherein the arrangement further comprises:
 a third determining circuit for determining a traffic load,
 a first determining circuit for determining at least the first indicator, and
 a second determining circuit for determining at least the second indicator based on the determined traffic load.

29. The arrangement according to claim 28, wherein the arrangement further comprises a handling circuit for handling paging messages, whereby the handling circuit comprises a correlating circuit for correlating identities for mobile devices determined to be blocked from network initiated communication with addresses of paging messages for such mobile devices.

30. The arrangement according to claim 29, wherein the handling circuit further comprises a discarding circuit for discarding paging messages for mobile devices determined to be blocked from network initiated communication.

31. The arrangement according to claim 25, wherein the arrangement comprises a Base Station Controller and a Base Transceiver Station, or comprises a Radio Network Controller and a Node B.

32. The arrangement according to claim 25, wherein the arrangement comprises an eNode B.

33. The arrangement according to claim 25, wherein the second indicator is set in response to a subscription service level associated with the mobile device.

\* \* \* \* \*